United States Patent
Bertsch et al.

(10) Patent No.: US 10,325,156 B1
(45) Date of Patent: Jun. 18, 2019

(54) MANUFACTURE OF PRINTED IMAGE INVENTORIES

(71) Applicant: Eight Plus Ventures, LLC, Santa Monica, CA (US)

(72) Inventors: Christoph Bertsch, Pacific Palisades, CA (US); Rodney Lake, Santa Monica, CA (US); Douglas Sturgeon, Half Moon Bay, CA (US); Anthony Sziklai, Oak Park, CA (US)

(73) Assignee: Eight Plus Ventures, LLC, Santa Monica, CA (US)

( * ) Notice: Subject to any disclaimer, the term of this patent is extended or adjusted under 35 U.S.C. 154(b) by 0 days.

(21) Appl. No.: 16/017,876

(22) Filed: Jun. 25, 2018

(51) Int. Cl.
| | |
|---|---|
| *H04N 9/80* | (2006.01) |
| *G06K 9/00* | (2006.01) |
| *H03M 1/00* | (2006.01) |
| *G06T 1/00* | (2006.01) |

(52) U.S. Cl.
CPC ..... *G06K 9/00744* (2013.01); *G06K 9/00288* (2013.01); *G06K 9/00362* (2013.01); *G06T 1/0021* (2013.01); *H03M 1/001* (2013.01); *G06K 2009/00328* (2013.01)

(58) Field of Classification Search
USPC .................................................. 386/248, 260
See application file for complete search history.

(56) References Cited

U.S. PATENT DOCUMENTS

| | | | | |
|---|---|---|---|---|
| 7,209,571 B2* | 4/2007 | Davis | ...................... | G06F 21/10 |
| | | | | 382/100 |
| 9,690,967 B1* | 6/2017 | Brundage | ............. | G06T 1/0021 |
| 2002/0146123 A1 | 10/2002 | Tian et al. | | |
| 2004/0153649 A1* | 8/2004 | Rhoads | ................. | G06F 17/241 |
| | | | | 713/176 |
| 2005/0010792 A1* | 1/2005 | Carpentier | .......... | G06F 11/1453 |
| | | | | 713/193 |
| 2008/0049971 A1 | 2/2008 | Ramos et al. | | |
| 2008/0228733 A1 | 9/2008 | Davis et al. | | |

(Continued)

OTHER PUBLICATIONS

Ando et al. image Recognition Based Digital Watermarking Technology for Item Retrieval in Convenience Stores, journal, Feature Articles: Creating New Services with corevo-NTT Group's Artificial Intlligence Technology, vol. 15 No. 8, published Aug. 2017, 6 pages.

(Continued)

*Primary Examiner* — Nigar Chowdhury
(74) *Attorney, Agent, or Firm* — SoCal IP Law Group LLP; Steven C. Sereboff

(57) ABSTRACT

There are disclosed methods and apparatus for manufacture of prints produced and packaged from image inventories. A physical print production and packaging machine assigns metadata to each physical print of a frame of a digital video work. It takes objects that have been detected, recognized and assigned metadata to the objects by the frame slicing and packaging machine and detects, recognizes and assigns new items of metadata to objects that are unique to the physical print. The print production and packaging machine then generates a cryptographic hash of the physical print's digital file. Lastly, the print production and packaging machine writes the hash to a node of a transaction processing network.

17 Claims, 4 Drawing Sheets

(56) References Cited

U.S. PATENT DOCUMENTS

| | | | |
|---|---|---|---|
| 2010/0029380 A1* | 2/2010 | Rhoads | A63F 13/10 |
| | | | 463/29 |
| 2010/0080471 A1* | 4/2010 | Haas | H04N 1/00846 |
| | | | 382/217 |
| 2013/0003126 A1* | 1/2013 | Van Osdol | G06F 3/1204 |
| | | | 358/1.15 |
| 2014/0049653 A1 | 2/2014 | Leonard et al. | |
| 2015/0100578 A1* | 4/2015 | Rosen | G06F 17/30598 |
| | | | 707/737 |
| 2015/0172787 A1* | 6/2015 | Geramifard | H04N 21/8549 |
| | | | 725/40 |
| 2017/0140346 A1* | 5/2017 | Whitehouse | G06Q 20/3274 |
| 2018/0046889 A1* | 2/2018 | Kapinos | G06F 21/00 |
| 2018/0257306 A1* | 9/2018 | Mattingly | B29C 64/393 |

OTHER PUBLICATIONS

Cryptoart, "Cryptoart is like a piggy bank. Each art piece physically stores Bitcoin. Each art piece also includes an easy 3-step guide to understanding Bitcoin", online article, https://cryptoart.com/how-cryptoart-works/, last accessed Jul. 25, 2018, 3 pages.

R.A.R.E., A new age platform for collecting unique, scarce digital art, cultivating the next generation of artists and collectors, https://www.rareart.io/#How-RARE-Works, last accessed Jul. 25, 2018, 6 pages.

* cited by examiner

MANUFACTURE OF PRINTED IMAGE INVENTORIES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to production of physical prints from digital images.

Description of the Related Art

A movie is a collection of still images that are shown one after the other in quick succession. When the images are viewed in quick succession (approximately 24 images per second), the human brain interprets the images as a motion picture or movie. Therefore, a traditional movie that is shown in theaters is a display of images in quick succession on the order of approximately 24 images per second, or 129,600 images for a 90-minute movie (24 images per second×60 seconds per minute×90 minutes). Movies made in non-digital (e.g., photographic film) media can be converted to digital format, and the converted movies as well as movies originally made in digital format can have individual images extracted from the master digital media file. Physical (e.g., hard copy) prints can be made from the still images.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
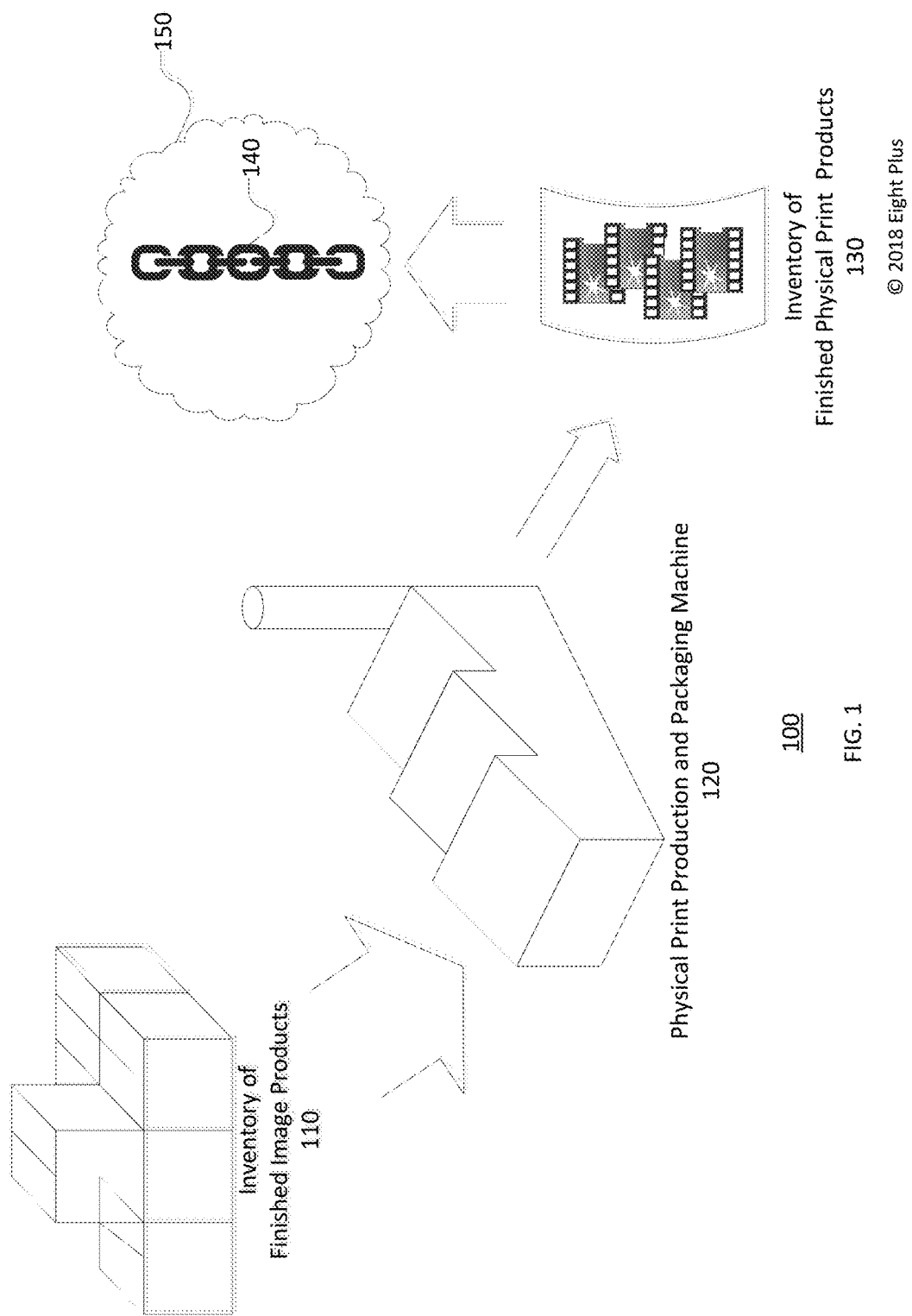
FIG. 1 is a block diagram of a system for production of printed image inventories.

Referring now to FIG. 1 there is shown a block diagram of a system 100 for production of physical print inventories. The system 100 includes one or more finished image product inventory 110 items, a physical print production and packaging machine 120, an inventory of finished physical print products 130, and transaction processing nodes 140.

Figure 2:
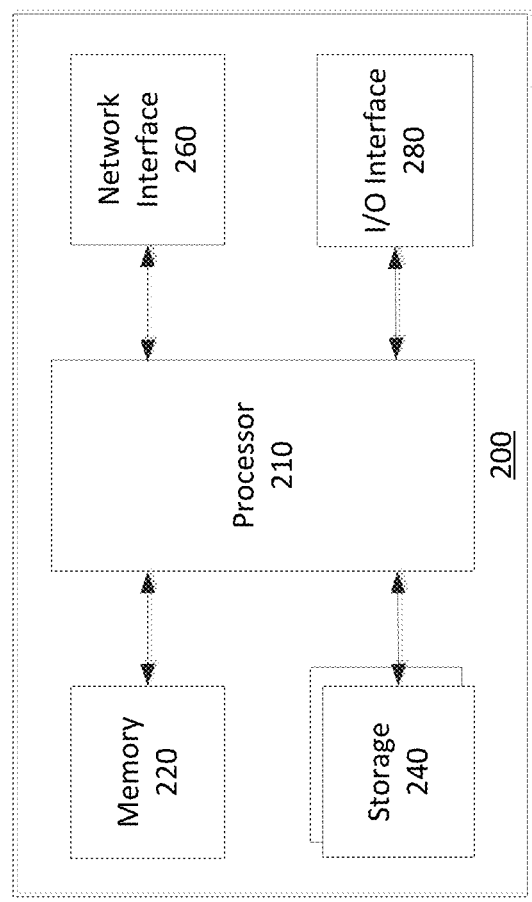
FIG. 2 is a block diagram of a computing device.

The physical print production and packaging machine 120 produces the inventory of finished physical print products 130 and moves them into the transaction processing nodes 140. The physical print production and packaging machine 120 may be a computer system, such as shown in FIG. 2, including one or more non-volatile machine-readable media storing a program having instructions which when executed by a processor will cause the processor to produce the inventory of finished image products 130.

Figure 4:
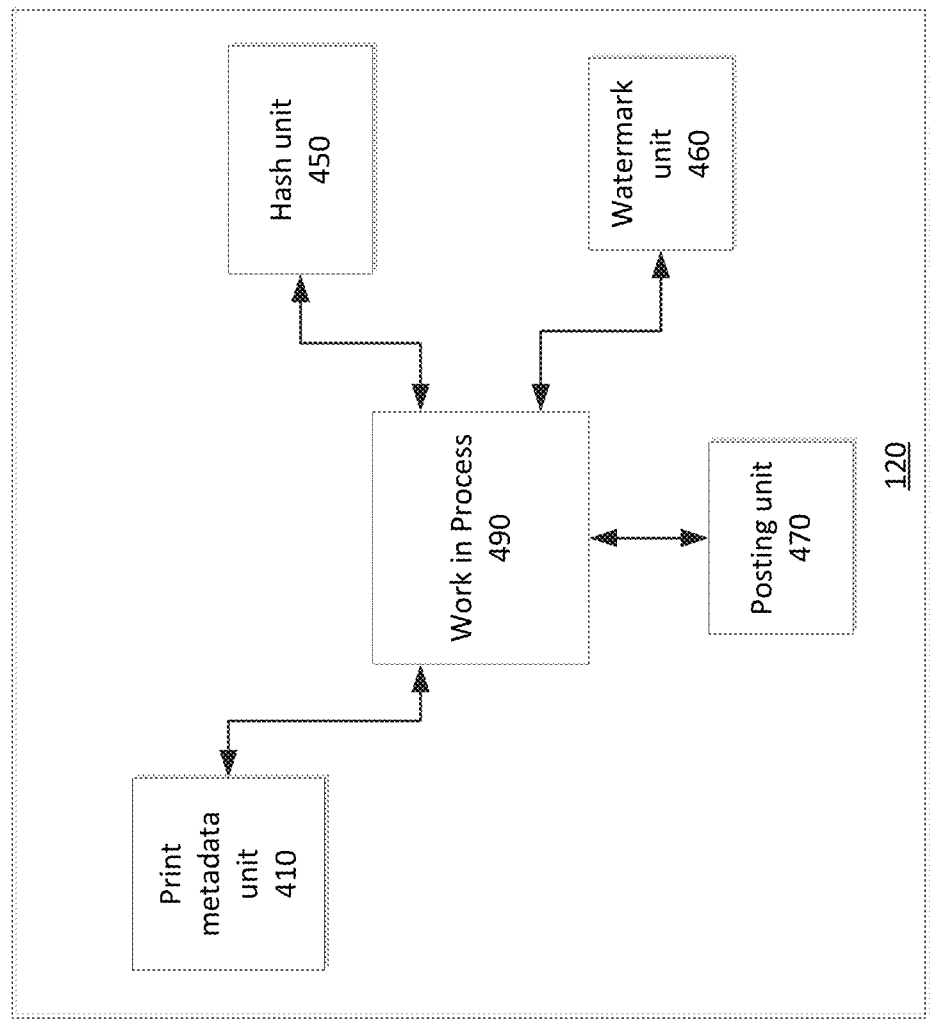
FIG. 4 is a block diagram of a physical print production and packaging machine.

As shown in FIG. 4, the physical print production and packaging machine 520 may include a physical print metadata unit 410, a physical print framing (e.g., the decorative and/or protective device that the physical print is attached to or mounted in) metadata unit 420, a hash unit 430, a watermark unit 440, and a posting unit 470. These units 410, 420, 430, 440, 470 interact with a work in process subsystem 490, which may be the storage 240 (FIG. 2). The posting unit 470 may effectuate its work through the I/O interface 280 (FIG. 2).

Each finished print product in the inventory 130 is a chattel good, capable of transfer on an individual basis.

The transaction processing nodes 140 may be in an information technology cloud 150, such as cloud storage. The transaction processing nodes may be in a blockchain.

Description of Processes

Figure 3:
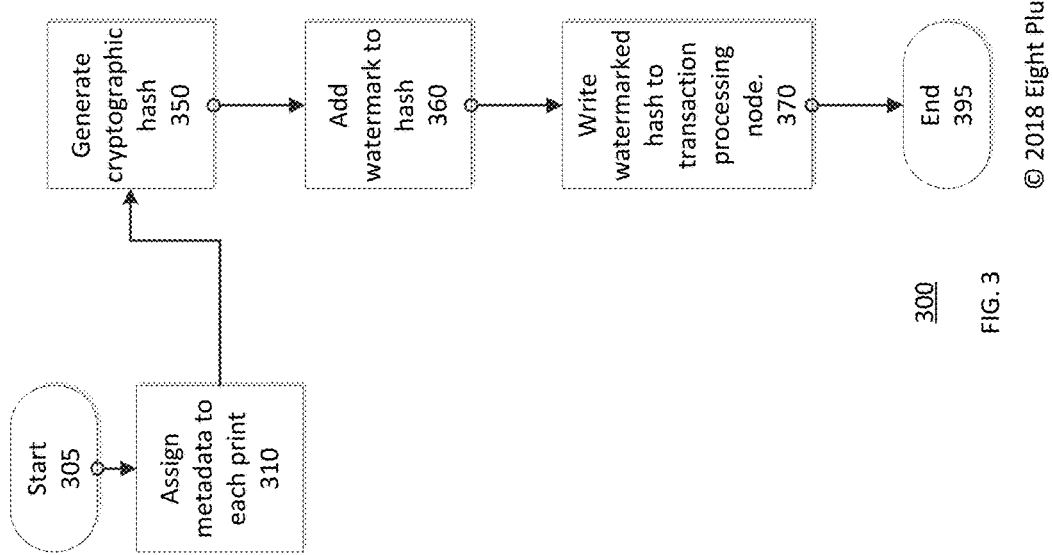
FIG. 3 is a flowchart of a process for production of physical prints from image inventories.

Referring now to FIG. 3 there is shown a flowchart 300 of a process for production of physical prints. The process 300 may be performed by the physical print production and packaging machine 120 of FIG. 1 and FIG. 4, having as inputs the finished image product inventory 110 items, and manufacturing the inventory of finished physical print products 130. The flow chart 300 has both a start 305 and an end 395, but the process is cyclical in nature.

Next, metadata is assigned to each physical print of the digital video work being produced (step 310). This may be performed by the print metadata unit 410. The print metadata may include a copy of the following items: identification of the work, provenance of the work, an identification of the frame within the work and may include additional new items. The metadata may include: colors in the print; effects or filters added to the print; tags previously assigned to the image frame that describe the frame being printed; package elements of the print such as where an image is split into two or more sub-prints to give a sense of motion; physical substrate material the print is printed on; where a physical frame or other protective holding device is ordered with the print, the material the device is composed of; border material, if any; print protective materials; print and frame protective materials, if any; hanging system supplied with the print, if any. The provenance of the work may include: the identity of the print production and packaging machine; the geographic location and timestamp where the print was originally produced or subsequently processed; names or other identification of the people, equipment and firms which did the production and processing; language and subtitles; details of how the production and processing were performed; and details of errors and errata from the production and processing. Metadata for a given image frame that is being printed may include a sequence of images from immediate prior and or subsequent frames, or thumbnails of them, such as from a video or collection of still images. The metadata for each frame may be stored in a single file, with a CSV, XML or JSON format. The metadata from plural frames may be stored in a database, and the database may also include the correlated images.

Metadata for prints of frames of video may include: frame number in the overall frame count for the movie or segment or video or video clip or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; studio.

Metadata for prints of frames of still images may include: title or identity of the collection or sub-collection of which the image is a part; artist; subject; category; album; session; sequence; session index; sequence index; camera used; number of photographs in the album, session and or sequence.

Additional frame or object metadata may include whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Arizona, appearing in the frame; popular or famous objects, such as the Millennium Falcon, appearing in the frame; desired color composition appearing in the frame; quality of preservation or original source media, as whether it is deteriorated or is damaged; pre-existing value of adjacent segments or frames.

Next, for each frame, a cryptographic hash is generated of the frame's image, the frame metadata, and the object metadata (step 350). This may be performed by the hash unit 450, which encrypts information items about a print along with the digital file of the print itself into a hash value that uniquely identifies the printed image frame and information items about the image frame. Thus, if even a single digital bit is changed in the files of the print and information items about the print that are input into the cryptographic hashing algorithm, the resulting hash value will be completely different from the hash value before the digital bit was changed. The hash unit 450 may produce a hash value from the representation of the print file along with the image frame and object metadata. The hash unit 450 packages the hash value with the corresponding print. This hash value is more efficient and technologically superior to prior art index prints which aim to confirm that an individual print is part of a collection of prints shown in the index print.

The cryptographic hashing of the image from a frame with the metadata is performed to be able to objectively and transparently confirm authenticity of the image and the metadata into the future. This allows reliable chain of title and chain of custody and can support a reliable market for the image.

Next a watermark may be added to the hash (step 360) to protect the linkage of the image file with its hashed value from malicious tampering. This may be performed by the watermark unit 460. The watermark unit 460 packages the watermarked hash value with the corresponding print.

Next, the watermarked hash is written to a node of a transaction processing network (step 370). This may be performed by the posting unit 470 by generating a transaction to register the watermarked hash along with its record provenance into a blockchain. Writing to the node may be under control of a smart contract. The hash values provided by the hash unit 450, or the packages from the watermark unit 460, are recorded by the posting unit 470 into the transaction processing nodes 140, which may be in a secure transaction processing network, distributed ledger or blockchain, or other transaction processing environment. The distributed ledger may be an immutable distributed ledger.

The transaction processing nodes may support queries. Thus, an individual who might want to purchase an image inventory item 110 or a physical print item 130, with the physical print item 130 as a package with a protective or decorative frame, or just the physical print, could make a query to confirm the authenticity of the image. Each hashed package or physical print will have a different hash value—even hashes of the same package or physical print will have different hash values.

FIG. 2 is a block diagram of a computing device 200. A computing device as used herein refers to any device with a processor, memory and a storage device that may execute instructions including, but not limited to, personal computers and server computers. These computing devices may run an operating system, including variations of the Linux, Microsoft Windows, and Apple Mac operating systems.

The computing device 200 may be representative of the physical print production and packaging machine 120 (FIG. 1). The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware may provide location-based services.

The computing device 200 has a processor 210 coupled to a memory 220, storage 240, a network interface 260 and an I/O interface 280. The processor 210 may be or include one or more microprocessors, field programmable gate arrays (FPGAs), application specific integrated circuits (ASICs), programmable logic devices (PLDs) and programmable logic arrays (PLAs).

The memory 220 is a non-transitory storage medium and may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210. As used herein the term memory corresponds to the memory 220 and explicitly excludes transitory media such as signals or waveforms. The techniques disclosed herein may be implemented with machine readable storage media in a storage device included with or otherwise coupled or attached to a computing device. That is, the software may be stored in electronic, machine readable media.

The storage 240 provides non-volatile, bulk or long-term storage of data or instructions in the computing device 400. The storage 240 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. In some cases, such as those involving solid state memory devices, the memory 220 and storage 240 may be a single device.

The network interface 260 includes an interface to a network such as a network that can be used to communicate calls, signals, streams, arrays, flagged samples and feedback described herein. The network interface 260 may be wired or wireless.

The I/O interface 280 interfaces the processor 210 to peripherals (not shown) such as displays, video and still cameras, microphones, keyboards and USB devices.

In some cases, storage 240 is a non-volatile machine-readable storage medium that includes all types of computer readable media, including magnetic storage media, optical storage media, and solid state storage media. The software can be installed in the frame slicing and packaging machine 120.

The technologies described herein provide various technological improvements to computer performance and efficiency. For example, the frame slicing and packaging machine 120 has performance enhancements over the prior art that results in more efficient production of an inventory of image products from frames of a digital video work. For example, the technologies described are technological improvements over those of the past because they provide verifiable provenance of images of frames that have been extracted from a motion picture, short video such as a music video, video clip, movie trailer, or individual still photographs. It is believed that there is no mechanism in the prior art to extract individual frames and concurrent with the extract, provide proof of authenticity or provenance of the extracted frames and metadata about the extracted frames.

Within this description, the terms engine or machine means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed synthesis. The synthesis may be performed automatically using a synthesis tool. The gate netlist or other physical description may be further converted into programming code for implementing the engine in a programmable device such as PLD, FPGA or PLA. The gate netlist or other physical description may be converted into process instructions and masks for fabricating the engine within an ASIC.

Some technologies described for the physical print production and packaging machine 120 and/or the computing device 200 include units. Within this description, the term unit means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card, or within a common FPGA, ASIC, or other circuit device.

Closing Comments

Throughout this description, the embodiments and examples shown should be considered as exemplars, rather than limitations on the apparatus and procedures disclosed or claimed. Although many of the examples presented herein involve specific combinations of method acts or system elements, those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising a non-volatile machine-readable medium storing a program having instructions which when executed by a processor will cause the processor to manufacture an inventory of print products from frames of a digital video work, each frame comprising a still image in sequence in the work, the instructions of the program for:
    assigning frame metadata to each print of the digital video work, the frame metadata including an identification of the work, provenance of the work, and an identification of the frame within the work;
    for each print, generating a cryptographic hash of the print's image, object metadata and the frame metadata,
        wherein the object metadata comprises metadata for objects recognized in the frame, wherein the recognized objects include at least one of a person, and animal or a good,
        wherein the frame metadata includes tags describing a minimum of one of the frame's image, a geographic location where the frame's image was filmed, a geographic location of where the frame's image is represented to be in the work,
        wherein the hash uniquely identifies the printed image;
    adding a watermark to the hash;
    creating proof of authenticity by writing the hash with the watermark to a node of a transaction processing network.

2. The apparatus of claim 1 further comprising extracting from a physical medium a sequence of analog form images and converting them to digital form.

3. The apparatus of claim 1 wherein the digital video work is a whole movie.

4. The apparatus of claim 1 wherein the digital video work is a portion of a movie.

5. The apparatus of claim 1 wherein metadata of a person comprises an actor's name.

6. The apparatus of claim 1 wherein the print metadata includes color compositions within the print.

7. The apparatus of claim 1 wherein the metadata for audio objects includes spoken lines and sounds.

8. The apparatus of claim 1 wherein the transaction processing network is a blockchain ledger.

9. The apparatus of claim 1 wherein the hash is an individual file, such that there is one file produced from each print of a frame of the digital video work.

10. A process for manufacturing an inventory of print products from frames of a digital video work, each frame comprising a still image in sequence in the work, the process comprising:

assigning frame metadata to each frame of the digital video work, the frame metadata including an identification of the work, provenance of the work, an identification of the processor, and an identification of the frame within the work;

for each print, generating a cryptographic hash of the print's image object metadata and the frame metadata;

wherein the object metadata comprises metadata for objects recognized in the frame, wherein the recognized objects include at least one of a person, and animal or a good, wherein the frame metadata includes tags describing a minimum of one of the frame's image, a geographic location where the frame's image was filmed, a geographic location of where the frame's image is represented to be in the work, wherein the hash uniquely identifies the printed image;

adding a watermark to the hash;

creating proof of authenticity by writing the hash to a node of a transaction processing network.

11. The process of claim 10 further comprising extracting from a physical medium a sequence of analog form images and converting them to digital form.

12. The process of claim 10 wherein the digital video work is a whole movie.

13. The process of claim 10 wherein the digital video work is a portion of a movie.

14. The process of claim 13 wherein metadata of a person comprises an actor's name.

15. The process of claim 10 wherein the frame metadata includes color compositions within the frame.

16. The process of claim 10 wherein the transaction processing network is a blockchain ledger.

17. The process of claim 10 wherein the hash is an individual file, such that there is one file produced from each print of a frame of the digital video work.

\* \* \* \* \*